United States Patent [19]
Adkins et al.

[11] Patent Number: 5,874,623
[45] Date of Patent: *Feb. 23, 1999

[54] PROCESS FOR THE PRODUCTION OF POLYETHER AMINOALCOHOLS

[75] Inventors: Rick L. Adkins, New Martinsville; William E. Slack, Moundsville, both of W. Va.

[73] Assignee: Bayer Corporation, Pittsburgh, Pa.

[ * ] Notice: The portion of the term of this patent subsequent to Jul. 5, 2011, has been disclaimed.

[21] Appl. No.: 101,509

[22] Filed: Aug. 2, 1993

[51] Int. Cl.$^6$ .................................................. C07C 209/02
[52] U.S. Cl. .......................... 564/474; 564/468; 564/483
[58] Field of Search ..................................... 564/468, 483, 564/474

[56] References Cited

U.S. PATENT DOCUMENTS

| | | | |
|---|---|---|---|
| 3,654,370 | 4/1972 | Yeakey | 260/584 B |
| 4,471,138 | 9/1984 | Stogryn | 564/505 |
| 4,902,768 | 2/1990 | Gerkin et al. | 528/68 |
| 5,015,774 | 5/1991 | Suekane et al. | 564/475 |
| 5,112,979 | 5/1992 | Lin et al. | 546/244 |
| 5,114,755 | 5/1992 | Canaday et al. | 427/373 |
| 5,213,585 | 5/1993 | Oppenlaender et al. | 44/433 |
| 5,326,829 | 7/1994 | Slack et al. | 564/505 |

OTHER PUBLICATIONS

Matsuda et al., Chem. Abs. 80(22):122681v (1974).

Maeda et al., Tetrahedron, vol. 38, No. 22, pp. 3359–3362 (1982).

*Primary Examiner*—Brian M. Burn
*Attorney, Agent, or Firm*—Joseph C. Gil; Lyndanne M. Whalen; Godfried R. Akorli

[57] ABSTRACT

Disclosed herein is a method of preparing polyether aminoalcohol by reacting a primary aminoalcohol with a polyether terminated with a good leaving group.

6 Claims, No Drawings

PROCESS FOR THE PRODUCTION OF POLYETHER AMINOALCOHOLS

BACKGROUND OF THE INVENTION

1. Field of Invention

The present invention relates to a process for preparing a polyether aminoalcohol having a low viscosity, a good reactivity and particular suitability for reaction injection molding (RIM) systems.

2. Brief Description of the Prior Art

Polyethers polyols and processes for preparing and using the same are known in the art. Of particular interest here are polyether polyols which are especially useful in reaction injection molding (RIM) systems.

As would be realized, there is ongoing research into the preparation of polyethers which have desirably fast reactivity and are at the same time processable.

U.S. Pat. No. 3,654,370 discloses amine-terminated polyethers which are prepared by reacting polyols with ammonia under catalyzed high temperature reaction conditions.

U.S. Pat. No. 4,902,768 discloses N-(polyoxyalkyl)-N-(alkyl)amine by catalytic amination of an appropriate polyol by reacting the polyol with a primary or secondary amine in the presence of a catalyst such as nickel.

U.S. Pat. No. 5,015,774 discloses a process for preparing polyoxyalkylene polyamines having secondary amino groups at the end of the polyamine by reacting polyoxyalkylene polyol with a primary amine in the presence of a catalyst containing nickel and zinc, cobalt and zinc or cobalt, zinc and nickel.

U.S. Pat. No. 5,112,979 discloses polyoxyalkyleneamines containing tetraalkylpiperidine functionality and their use as light, heat and oxidation stabilizers.

U.S. Pat. No. 5,114,755 discloses block copolymers of ethylene oxide and at least one other alkyleneoxide which are formed by by the addition of propylene oxide to ethylene diamine.

EP 0,489,322-A2 discloses what is seemingly a hydrogenative amination of a polyglycol followed by alkoxylation by ethylene oxide, propylene oxide or butylene oxide.

By the present invention, there is provided an efficacious method of preparing polyethers polyols which contain both a secondary amine group and a hydroxyl group which are very well suited to use in RIM systems.

SUMMARY OF THE INVENTION

In accordance with the foregoing, the present invention relates to a method of preparing a polyether aminoalcohol by reacting a primary aminoalcohol with a polyether containing a good terminal leaving group, at 50 to 250 degrees Centigrade. By the term polyether aminoalcohol is meant a $C_2$, $C_3$, or $C_4$ polyether polyol which contains a reactive amine, more specifically an isocyanate reactive amine, within its backbone and also contains a terminal hydroxyl group. This and other aspects of the invention are described more fully hereunder.

DETAILED DESCRIPTION OF THE INVENTION

The polyether aminoalcohols of this invention have a functionality of between 2 and 12, and preferably 2 to 9 and a molecular weight of from about 119 to 10,000 and preferably 300 to 6000. They are further characterized in that they have relatively low viscosities ranging from about 50 to 8000 centipoises, and preferably 100 to 5000 and an equivalent weight ranging from 50 to 2500 and preferably 100 to 1800. As set forth above, the polyether aminoalcohol is prepared by reacting a polyether containing a terminal leaving group with a primary aminoalcohol selected from the group consisting of aminoalkylalcohols, aminoarylalcohols, aminoalkylpolyols, aminoarylpolyols, or aminophenols at a temperature of about 50° to 250° C.

The polyether containing a terminal leaving group can be obtained by converting the hydroxyl group of a polyether polyol to a suitable leaving group. Non-limiting examples of the leaving groups can be selected from the group consisting of halides, sulfonates and nitrophenoxides and the like.

Polyethers polyols suitable for use in accordance with the invention can be obtained by the polymerization of alkylene oxides such as ethylene oxide, propylene oxide, butylene oxide, tetrahydrofuran, styrene oxide or epichlorohydrin on their own, for example in the presence boron trifluoride, or by the addition of these epoxides, optionally in admixture or successively onto starter components containing reactive hydrogen atoms, such as water, alcohols or amines, for example ethylene glycol, 1,3- or 1,2-propylene glycol, trimethylol propane, 4,4'-dihydroxydiphenyl propane, aniline ammonia, ethanolamine or ethylene diamine or a mixture thereof.

Tertiary amine catalysts suitable for use in accordance with the invention can be pyridine, triethylamine, tributyl amine and the like. Specific but non-limiting example of the amides can be N,N-dimethylformamide and N,N-dibutylformamide.

In preparing a polyether containing a halide leaving group, e.g., a polyether alkyl halide, a halogenation agent corresponding to the halide is reacted with a polyether polyol. Generally, such a reaction can be conducted at a temperature ranging from 0 to 40 degrees Centigrade over a period of up to 8 hours. There is formed an intermediate product which rearranges at a temperature ranging from 75 to 150 and preferably 100 to 120 degrees Centigrade, in the presence of a tertiary amine or amide catalyst to produce polyether alkyl halides. As a specific example, a polyether polyol is reacted with a carbonyl chloride (phosgene). A polyether chloroformate is formed and rearranges to form a polyether alkyl chloride. Other halogenation agents that can be reacted with a polyether polyol can be thionyl chloride or triphenyl phosphine in carbon tetrahalide.

In preparing a polyether containing a sulfonate leaving group such as a polyether sulfonate, a polyether polyol can be reacted with, say, methanesulfonyl chloride in the presence of a tertiary amine or amide. Illustrative but non-limiting examples of the tertiary amines can be pyridine, triethylamine, tributylamine. Specific but non-limiting examples of the amides can be N,N-dimethylformamide or N,N-dibutylformamide. The reaction can be conducted at a temperature in the range of −30° to 40° C. to form a polyether sulfonate.

The aminoalcohols are reacted with the polyether containing a leaving group over a temperature range of 50 to 250 degrees Centigrade to produce the polyether aminoalcohols of the invention. The useful aminoalcohols can be aminoalkyl or aminoarylalcohols that contain from 2 to 18 and preferably 2 to 12 carbon atoms. The amino hydroxy compounds can also contain from 1 to 8 and preferably 1 to 6 hydroxyl groups and/or 1 to 6 and preferably 1 to 2 amino groups. Illustrative but non-limiting examples of aminoalcohols can be selected from the group consisting of 2-aminoethanol, 2-amino-2-methyl-propanol, 2-amino-2-methyl-1,3-propanediol, 4-aminobenzyl alcohol, aminophenol. The ratio of moles of aminoalcohol to equivalents of leaving group of the polyether is in the ratio of between 12 to 1 and 0.5 to 1 and preferably 3 to 1.

It is believed that the polyether leaving group undergoes a displacement reaction to form the polyether aminoalcohol.

Sodium bicarbonate, sodium hydroxide, or tertiary amines can be employed as acid scavengers in the displacement reaction. Any good solvent such as toluene, chlorobenzene, or THF can be used in the above reactions, if desired.

The resultant polyether aminoalcohols are obtained in high conversions (up to 100%) with relatively low viscosities of about 8000 mPa.s for a nona-functional polyether.

The invention is further illustrated but is not intended to be limited by the following examples in which all parts and percentages are by weight unless otherwise specified.

EXAMPLES

Polyols

In the examples which follow, the polyether polyol used was a glycerin/propylene oxide/ethylene oxide adduct, with the ethylene oxide being present as a 17% by weight termination, having a 4800 molecular weight. (Polyol A)

Mesylate Preparation

Polyol A (0.312 eq), triethylamine (0.350 mol), and 60 ml $CH_2Cl_2$ were added to a 2 L 3-necked flask fitted with a stirrer and reflux condenser (under nitrogen). Methanesulfonyl chloride (0.350 mol) was added dropwise, keeping the solution temperature at 25° C. with an ice water bath. The reaction solution was stirred at room temperature for 0.5 h, then neutralized with NaOH (0.350 mol). Triethylamine, solvent, and water were vacuum stripped and the product filtered to give a clear, colorless liquid. (Mesylate A)

Example 1

Mesylate A (0.060 eq) was added to a 500 ml 3-necked flask fitted with a stirrer and reflux condenser (under nitrogen). 3-Aminopropanol (0.18 mol) was added and the solution was heated at 150° C. for 2 h. The solution was cooled and neutralized with NaOH (0.060 mol). Excess aminoalcohol and water were vacuum stripped and the product filtered to give a clear, light yellow liquid with a viscosity of 2550 mPa°s and an amine number of 30.3. The conversion was 90% based on the amine number.

Examples 2-5

These examples were run using conditions identical with Example 1, keeping mole-equivalents ratios constant. (See Table 1).

TABLE 1

Polyether Aminoalcohol Formation Via Displacement

| Example | Mesylate | Amino-Alcohol | Temp °C. | Time hr. | Amine # | % Conversion (based on NH#) | Viscosity mPa · s, 25° C. |
|---|---|---|---|---|---|---|---|
| 2 | A | 2-Aminoethanol | 150 | 2.0 | 27.8 | 81.6 | 3670 |
| 3 | A | 2-Amino-2-methyl-1-propanol | 150 | 2.0 | 33.5 | 100.0 | 2220 |
| 4 | A | 2-Amino-2-methyl-1,3-propanediol | 150 | 2.0 | 30.0 | 90.4 | 3215 |
| 5 | A | 3-Amino-1,2-propanediol | 150 | 2.0 | 29.2 | 87.2 | 7550 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of preparing a polyether aminoalcohol having a molecular weight of from 300 to 10,000 and a secondary amine group and a hydroxyl group by reacting (a) a primary aminoalcohol with (b) a polyether terminated by a leaving group formed from a polyether polyol, at 50° to 250° C.

2. The method of claim 1 wherein the polyether is terminated by a leaving group which is a halide or a sulfonate.

3. The method of claim 1 wherein the primary aminoalcohol contains from 1 to 8 hydroxyl groups.

4. The method of claim 1 wherein the primary aminoalcohol contains from 1 to 6 primary amine groups.

5. The method of claim 1 wherein the primary aminoalcohol contains from 2 to 18 carbon atoms.

6. A polyether aminoalcohol having a molecular weight of from 300 to 10,000 and a secondary amine group and hydroxyl group which is prepared by the process of claim 1.

* * * * *